United States Patent [19]

Cinotti et al.

[11] Patent Number: 5,694,442
[45] Date of Patent: Dec. 2, 1997

[54] SYSTEM FOR PASSIVELY DISSIPATING HEAT FROM THE INTERIOR OF A NUCLEAR REACTOR CONTAINMENT STRUCTURE

[75] Inventors: Luciano Cinotti, Recco; Giuseppe Proto, Genova, both of Italy

[73] Assignee: Enel S.p.A., Rome, Italy

[21] Appl. No.: 687,476

[22] PCT Filed: Feb. 8, 1995

[86] PCT No.: PCT/EP95/00449

§ 371 Date: Aug. 5, 1996

§ 102(e) Date: Aug. 5, 1996

[87] PCT Pub. No.: WO95/22147

PCT Pub. Date: Aug. 17, 1995

[30] Foreign Application Priority Data

Feb. 14, 1994 [EP] European Pat. Off. ............ 94830056

[51] Int. Cl.⁶ .................................................. G21C 15/18
[52] U.S. Cl. ................................ 376/298; 376/299; 376/367
[58] Field of Search .................................. 376/298, 299, 376/367

[56] References Cited

U.S. PATENT DOCUMENTS

| | | | |
|---|---|---|---|
| 3,190,808 | 6/1965 | Dodd | 376/298 |
| 4,050,983 | 9/1977 | Kleimola | 376/367 |
| 4,950,448 | 8/1990 | Gou et al. | 376/298 |
| 5,076,999 | 12/1991 | Forsberg | 376/299 |

FOREIGN PATENT DOCUMENTS 2651568 3/1991 France.

OTHER PUBLICATIONS

Cinotti et al., *Liq. Metal Eng. and Tech. 3rd Int. Conf.-Oxford*, Sep. 13, Apr. 1984, vol. 1, pp. 487–491.

Bruschi et al., *Nuclear Technology*, vol. 91, La Grange Park, Illinois US, pp. 95–100.

*Pat. Abst. of Japan*, vol. 16, No. 72 (M–1213), Feb. 21, 1992 (English abstract of JP-A 03260501, Nov. 20, 1991).

*Primary Examiner*—Daniel D. Wasil
*Attorney, Agent, or Firm*—Keil & Weinkauf

[57] ABSTRACT

A system (10) for dissipating heat from the interior space (50) of a containment structure (3, 6) for a nuclear reactor (2), for an indefinite time period, comprises a first heat exchanger (15, 15') outside said containment structure (3, 6) which is submerged vertically in a pool (11) associated with the exterior of the top wall (4, 7) of the structure (3, 6), and a second heat exchanger (25) placed in the interior space (50), said first and second heat exchangers (15, 25) being fluid connected to each other in a closed loop circuit (28) with piping (23, 24) containing a thermal carrier fluid. Said pool (11 is provided with a covering (90) defining a first duct (12) in communication with an outside air intake, and a second duct (13) communication with a chimney (14), the interconnection of said ducts (12, 13) being inhibited by the water present in the pool (11) when filled to a predetermined level (9).

9 Claims, 10 Drawing Sheets

SYSTEM FOR PASSIVELY DISSIPATING HEAT FROM THE INTERIOR OF A NUCLEAR REACTOR CONTAINMENT STRUCTURE

DESCRIPTION

This invention relates to a system for dissipating heat from the interior of a nuclear reactor containment building, in particular for dissipating any heat generated on the sudden occurrence of an incidental malfunction of the standard cooling arrangements;

As is known, nuclear reactors, along with their primary cooling circuit, are currently placed inside a primary containment structure made of steel or concrete which is usually constructed of several layers or walls. This primary containment structure is, in turn, placed inside a building whose side walls and roof are in communication with the external atmosphere.

In the event of an emergency situation, the heat generated by the nuclear reactor within the primary containment structure must be dissipated of necessity to the structure and the building outside, without releasing to the external surroundings any of the fluids contained in the primary structure.

It matters to observe that a nuclear reactor, even when shut down by reason of an emergency situation, continues to generate heat from the nuclear fuel decay. The amount of heat generated is initially quite large, and decreases over time, but never really comes down to zero. Heat shall, therefore, have to be dissipated even after shutting down the reactor.

In order to meet current safety requirements, the manner of dissipating the heat must be passive—i.e. must not rely on automatically or manually operated control arrangements, on the actuation of pumps or the like, the opening of valves, or the availability of power sources of any kind, and be inherently activated by natural physical phenomena related to structural features.

From French Patent No. 8216104, a heat dissipating method is known wherein an external heat exchanger in thermal communication with the interior of the enclosure to be cooled is employed. The external heat exchanger releases to the atmosphere heat from within. The heat exchanger utilizes a thermal carrier fluid in natural circulation for transferring heat from the inside out. In addition, it is located inside an open duct provided with a natural draft chimney, whereby a more efficient dissipation is promoted by increasing the velocity of the airflow in the neighborhood of the heat exchanger.

However, this prior approach involves the use of an outside heat exchanger having large transfer surfaces for transferring the decay heat generated during the initial stage of the emergency to the surrounding air. Accordingly, its cost is high. Furthermore, when water is to be used for a thermal carrier, gates must be installed in the chimney to prevent the water within the heat exchanger from freezing in a condition of low outside temperature. The provision of such gates is in conflict with the aforementioned requirement for passive operation.

It is the object of this invention to provide a system for dissipating heat generated within a reactor containment structure on the occurrence of an accident, which can overcome the above drawbacks with which the prior art is beset.

This object is achieved by a heat dissipating system according to the appended claims.

The features and advantages of a heat dissipating system according to the invention will become apparent from the following description of two embodiments thereof, as well as from the accompanying illustrative, and in no way limitative, drawings.

Figure 1:
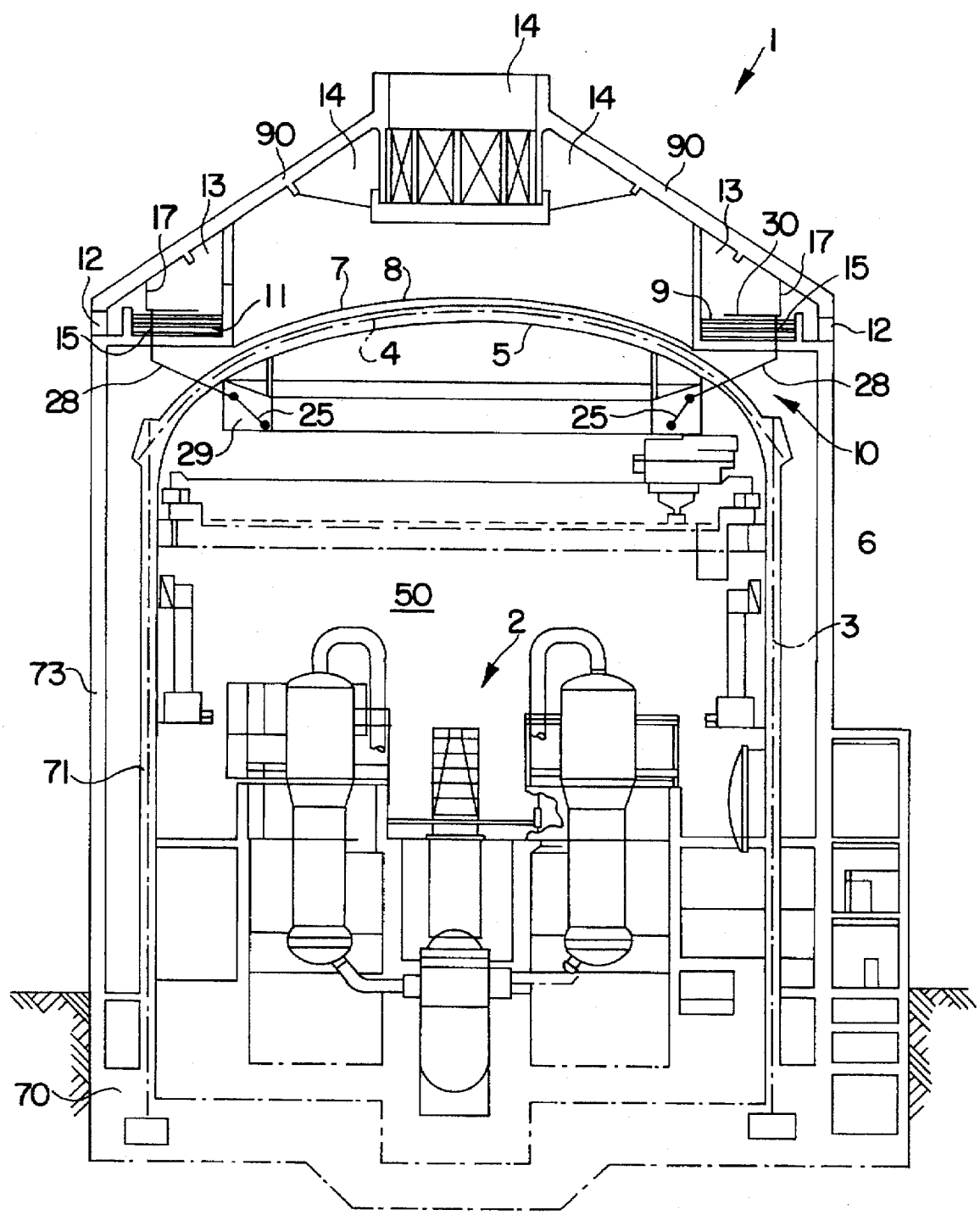
FIG. 1 is a general view showing schematically a building and an containment structure accommodating a nuclear reactor therein, which incorporate the system for dissipating heat in case of accident according to this invention.

Throughout the drawing views, a nuclear reactor containment building is denoted by 1. It houses the nuclear reactor proper, denoted by 2.

The building 1 accommodates an inner containment structure 3, substantially cylindrical in shape, which has a basement 70, side walls 71, and a top wall 4, with an inner surface 5 defining an interior space 50.

The containment structure 3 for the reactor is, in turn, placed within an outer containment structure 6, also substantially cylindrical in shape, which is erected on said basement 70 and has side walls 73 and a top wall 7 with an outer surface 8. Associated with the containment building 1 is a heat dissipating system, generally shown at 10.

Figure 6:
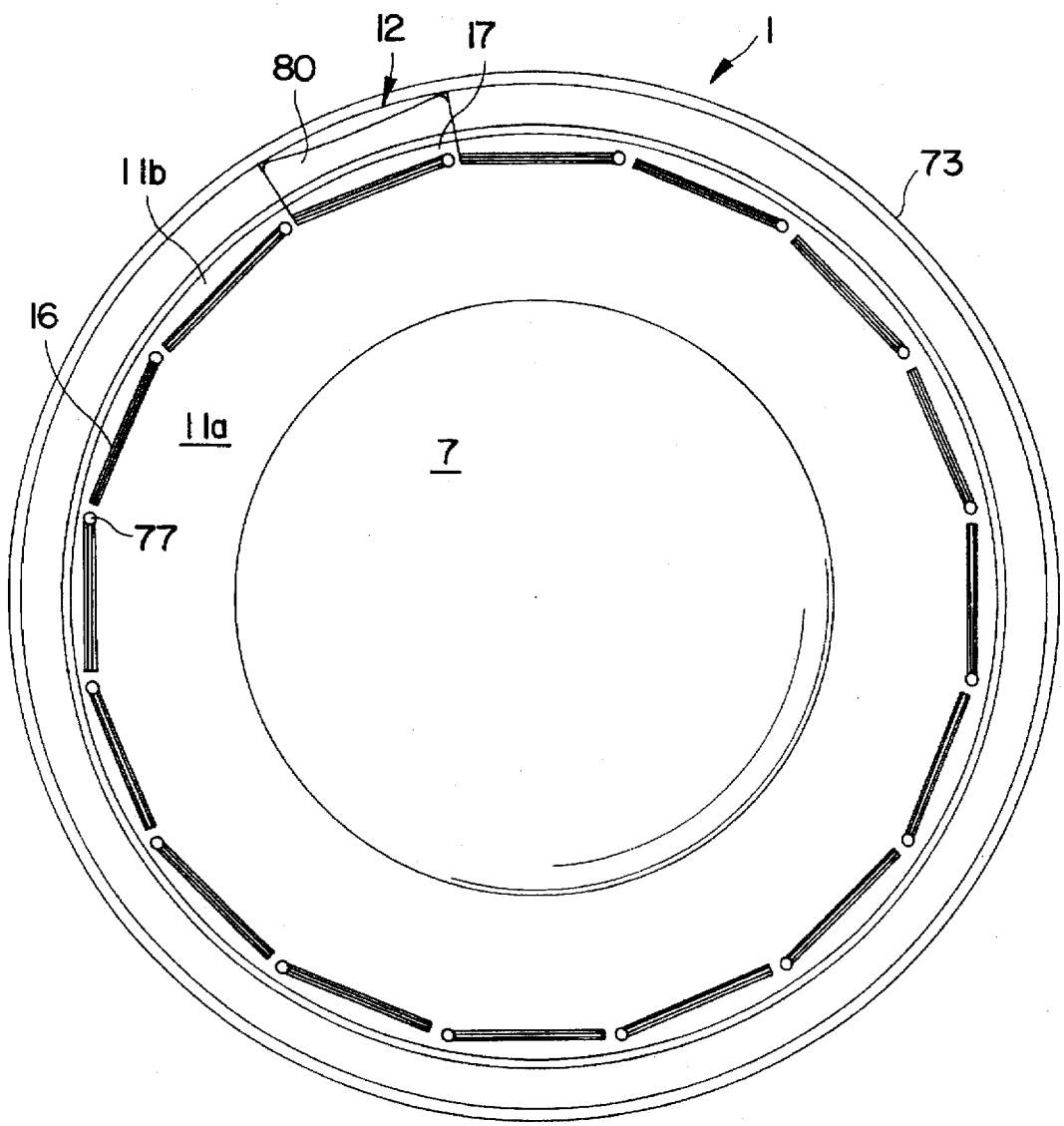
FIG. 6 is a schematic plan view of the pool and the parts in FIG. 4.

The system 10 comprises a pool 11 filled with water up to a given level 9, supported on the outer surface 8 of the top wall 7, and having a bottom 74. It extends into an annulus (FIG. 6) all around the top wall 7.

The pool 11 is interposed between a plurality of first ducts 12 having an outside air inlet 81 on the building exterior, and a plurality of second outlet ducts 13, each terminated with a chimney 14 which has a bottom wall 80. The first and second ducts 12, 13 are bounded by a covering 90 overlying the pool 11. In FIGS. 2, 3, 8, 10, there are shown a pair of ducts 12, 13 only, which form an assembly to be duplicated at regular intervals all around the annular spread of the pool 11.

The heat dissipating system 10 will now be described with reference to a single pair of first and second ducts 12, 13, it being understood that each of the components mentioned would, except where otherwise specified, be provided for each pair of the ducts 12, 13 present in the containment building 1.

A first heat exchanger, generally shown at 15, comprises a plurality of tube nest elements 16 fully submerged in the pool 11. It extends vertically upwards, from a base 75 adjacent to the bottom 74 of the pool 11, to a top portion 76. Each element 16 is arranged to geometrically divide the pool into two discrete parts 11a, 11b. The part 11a represents the termination of the duct 12, whereas the part 11b represents the start of the outlet duct 13.

A partition 17, in the form of a wall separating the first duct 12 from the second 13 and being included to the covering 90, extends between the bottom wall 80 of the chimney 14 and the top portion 76 of the first heat exchanger, such that the circulation of air through the ducts 12, 13 and the chimney 14 can be halted by the water in the pool 11 when the latter is filled to its maximum predetermined level 9.

Figure 5:
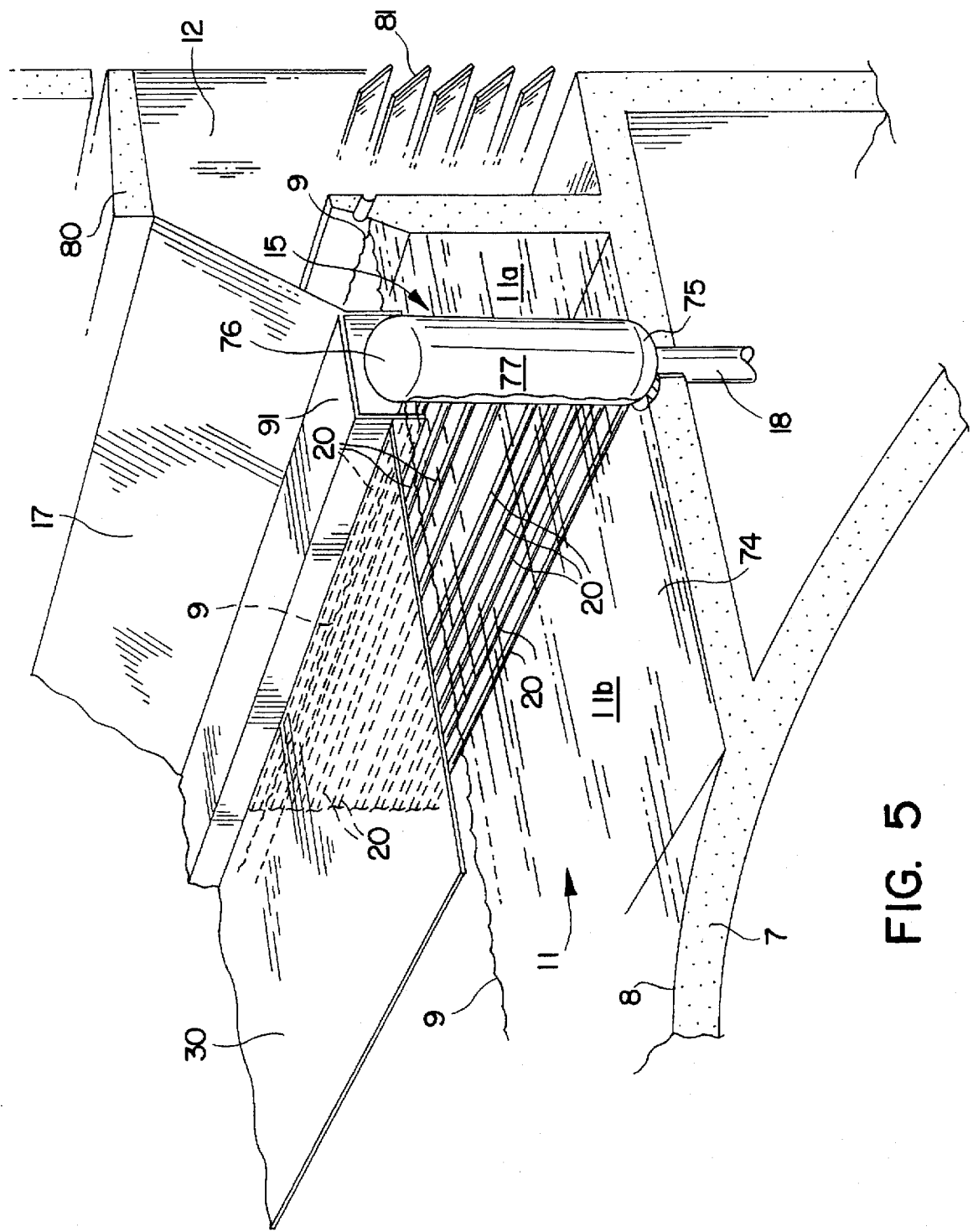
FIG. 5 is a perspective view showing schematically the heat exchanger in the pool.

The partition 17 is terminated with an inverted U-shaped channel which receives the top portion 76 of the exchanger 15 and intersects the predetermined water level 9 (FIG. 5).

The elements 16 of the first heat exchanger 15 are laid crosswise to the ducts 12, 13. They comprise tube nests 20 bent to a U-shape and connected to a delivery header 18 and a discharge header 19 defined within a vertical cylindrical vessel 77 which supports them cantilever fashion. If the length of the tubes 20 were such as to make the fabrication of this kind of support a difficult one, there may be provided vertical support structures, not shown, which would bear on the bottom 74 of the pool 11 alongside the tube nest elements 16.

In a preferred embodiment, the tubes 20 are finned helically.

The headers 18, 19 have an inlet section 21 and an outlet section 22, respectively. Respectively connected thereto are a delivery duct 23 and a discharge duct 24 which are passed through the containment structures 3, 6, at the respective top walls 4, 7.

They are connected to a second or inside heat exchanger 25 at respective outlet 26 and inlet 27 sections thereof. The second heat exchanger 25, of the type having bundles of either smooth or finned tubes, is suspended from the inner surface 5 of the top wall 4 of the containment structure 3.

Thus, it locates within the interior space 50 of the inner containment structure 3, where the nuclear reactor 2 is accommodated.

The heat exchangers 15, 25 and the ducts 23, 24 define a closed-loop circuit 28 which is expediently emptied of non-condensable gases and filled with a thermal carrier fluid, such as water or a two-phase mixture of water and steam.

The thermal carrier fluid is flowed by natural circulation through the closed-loop circuit, with no forced circulation means, e.g. pumps, being provided.

Thus, the closed-loop circuit 28 establishes thermal communication between the pool 11 and the interior space 50 of the containment structure 3 for the reactor 2.

Figure 7:
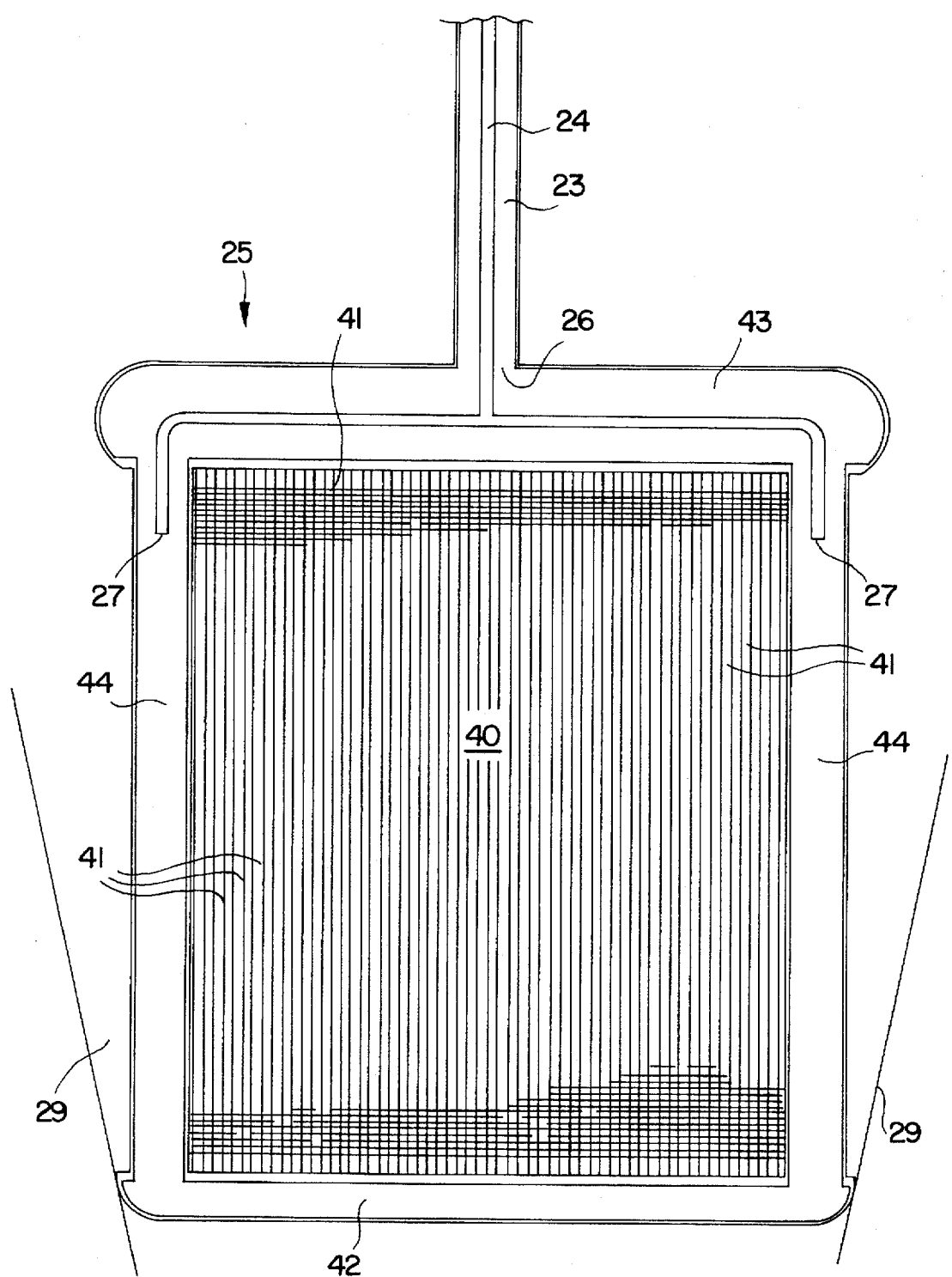
FIG. 7 is a longitudinal section through a tube nest element of the heat exchanger placed within the containment structure in thermal communication with the exchanger in the pool.

The second, inside heat exchanger 25 comprises, in a preferred embodiment of this invention (FIG. 7), a bundle 40 of straight finned tubes 41 arranged in plural rows. The tube bundle 40 locates between a lower header 42 and an upper header 43 placed at different levels and being connected to the discharge duct 24 and the delivery duct 23, respectively.

The headers 42 and 43 are also fluid connected together by an additional pipe 44, which is smooth and straight and has a larger diameter than the tubes 41 in the tube bundle 40.

The operation of this specific type of heat exchanger will be described in connection with the operation of the whole system 10.

Advantageously, the second heat exchanger 25 is placed within an open vertical channel 29, which extends downwardly from the second heat exchanger 25, formed from metal sheets 45, for example, and supported on the inside wall 5 of the inner top wall 4, to define a natural flow path for the air and steam contained in the interior space 50 creating a chimney effect inside said open vertical channel 25.

The operation of the system 10 according to the invention will now be described with reference to FIGS. 2 and 3.

Figure 2:
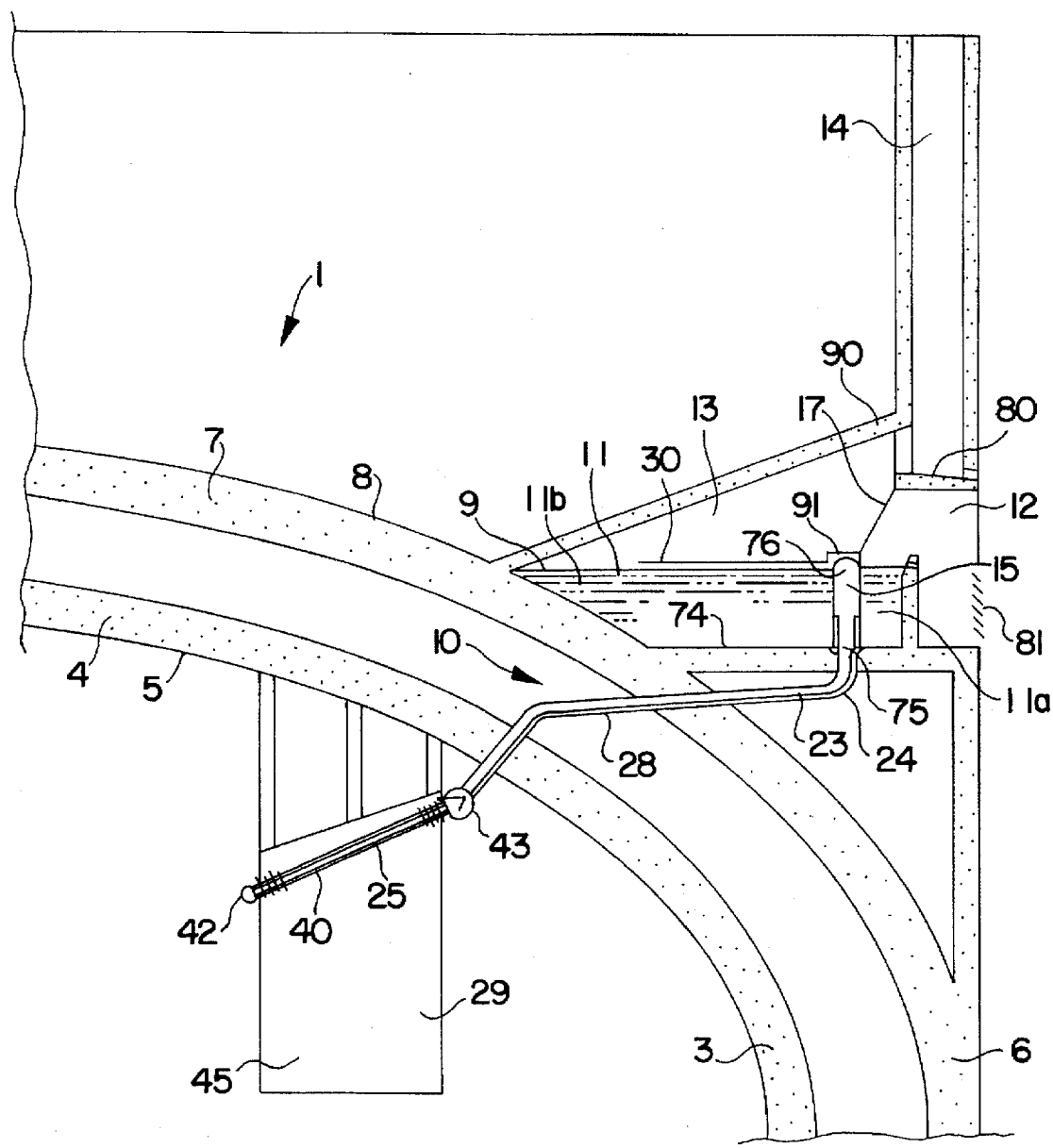
FIG. 2 is a scaled-up cross-sectional view showing schematically a top portion of the containment building in FIG. 1, with a heat dissipating system in a standby condition.

As shown in FIG. 2, the system 10 is in a standby condition, while no emergency situations involving the generation of heat in the interior space 50, that is inside the containment structure 3 for the reactor 2, has arisen.

Under that condition, the pool 11 would be filled up to capacity with water which reaches the level 9 intersecting the partition 17. Accordingly, the natural circulation of air along the path defined by the first and second ducts 12, 13 would be inhibited by the head of water.

The temperature of the water in the pool 11 is maintained within a similar range to that of the interior space 50 by reason of the heat transfer provided by the closed-loop circuit 28 and the heat exchangers 15, 25.

Upon the occurrence of an accident situation, the air inside the containment structure 3 for the reactor 2 would be powerfully heated. In particular, if the nuclear reactor 2 is of the boiling water type, steam is also likely to be released in large amounts.

At this time, the difference in temperature between the interior space 50 of the containment structure 3 and the water in the pool 11 would trigger on the natural circulation of thermal carrier through the circuit 28. As a result, heat is transferred between said interior space 50 and the water in the pool 11, which will begin to boil, while the steam in the interior space 50 condensates on the heat exchanger 25. On the other hand, the thermal carrier is also partly vaporized and will partly condensate in the tube nests 16 of the first heat exchanger 15.

It matters to observe that all the heat transfer mechanisms brought to play exhibit high heat transfer coefficients. This enables the system 10 to dissipate a large amount of heat at the very time when it is needed most, that is immediately after the accident has occurred.

The boiling water in the pool 11 causes the level 9 to drop below the partition 17 (FIG. 3), thereby opening the natural air circulation path defined by the ducts 12, 13.

This natural circulation is mainly triggered on by the chimney 14 becoming filled with steam, which has a lower density than air; this results in a significant natural draft forcing the air to flow through the ducts 12, 13.

Figure 3:
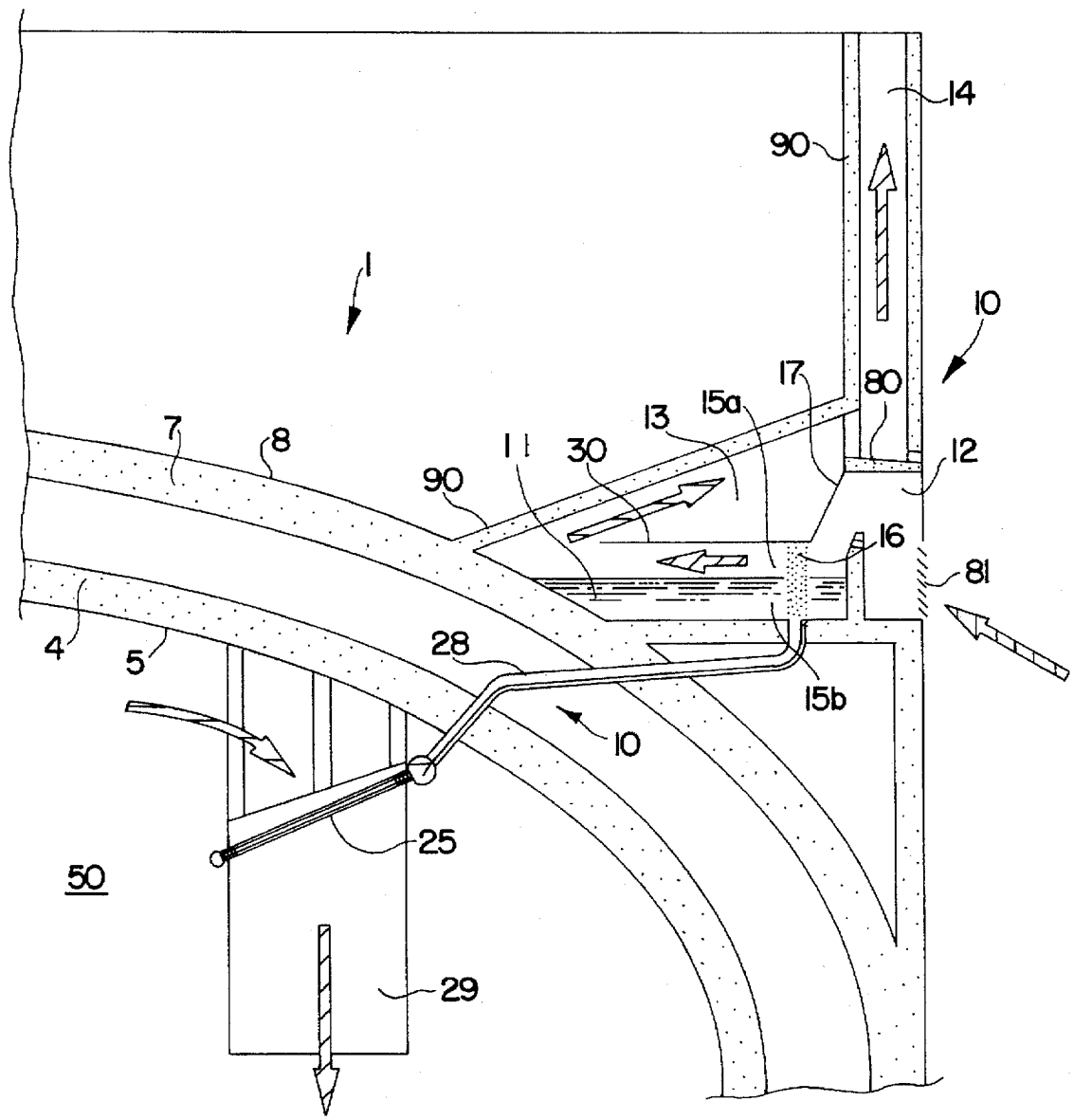
FIG. 3 shows the heat dissipating system of FIG. 2 while in operation.
Figure 4:
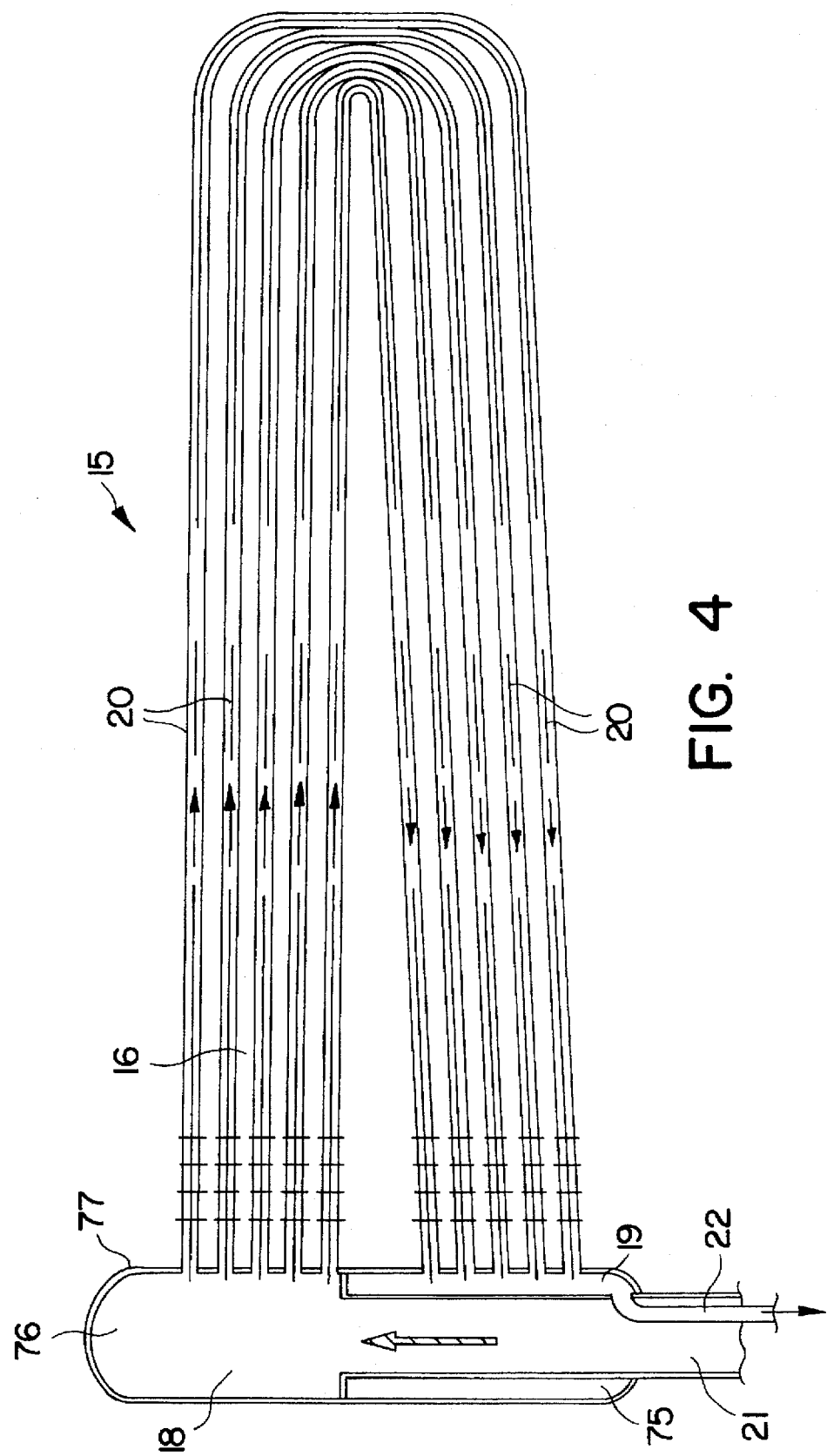
FIG. 4 is a longitudinal section view of a tube nest element of the heat exchanger placed in the pool.

The flowing air will sweep across a portion 15a of the heat exchanger 15 which has been exposed by the drop in the level 9 (FIG. 3). The level 9 also defines a submerged portion 15b of the exchanger 15 under the pool 11 water.

At said exposed portion, 15a, the outside heat transfer mechanism changes from boiling to forced dry air convection.

After moving past said exposed portion 15a of the exchanger 15, the flowing air is induced, in a preferred embodiment of the system 10, to sweep across the free substance of the pool 11 water throughout by an extension 30 of the partition 17 which cooperates to define the path of the second duct 13.

This expedient enables a more efficient removal of the steam being generated in the pool, thereby cooling the pool down to below 100° C., which further improves tile overall heat transfer efficiency.

As the emergency situation progresses, and absent any external intervention to top up tile water in the pool 11, the pool would be emptied.

Even it, this case, the dissipation of heat is ensured, for an indefinite period, by the natural circulation of air through the ducts 12, 13. The natural draft in said ducts 12, 13 is now due to the density differential between the air contained in the two ducts and is enhanced by the height of the chimney 14.

The second heat exchanger 25 (FIG. 7) is designed to deliver steam to the first heat exchanger 15 with the tube nests 16. In fact, the water within the tubes 41 will boil, but without being vaporized completely. Since the upper header 43 is at a higher level than the lower header 42, it will only deliver steam through the delivery duct 23, while the residual water is returned, though the additional pipe 44, to the lower header 42 along with the water condensated in the exchanger 15.

This design expedient causes the water entering the pipe 44 of the second exchanger 25 to be colder. Thus, the additional pipe 44 functions as a chimney, albeit traversed downwards from above, to thereby boost the natural draft due to the boiling in the tubes 41, and hence the fluid velocity through the tubes 41, which results in the heat transfer coefficient being improved within the tube bundle 40, wherein boiling is prevented by the water pressure.

Figure 8:
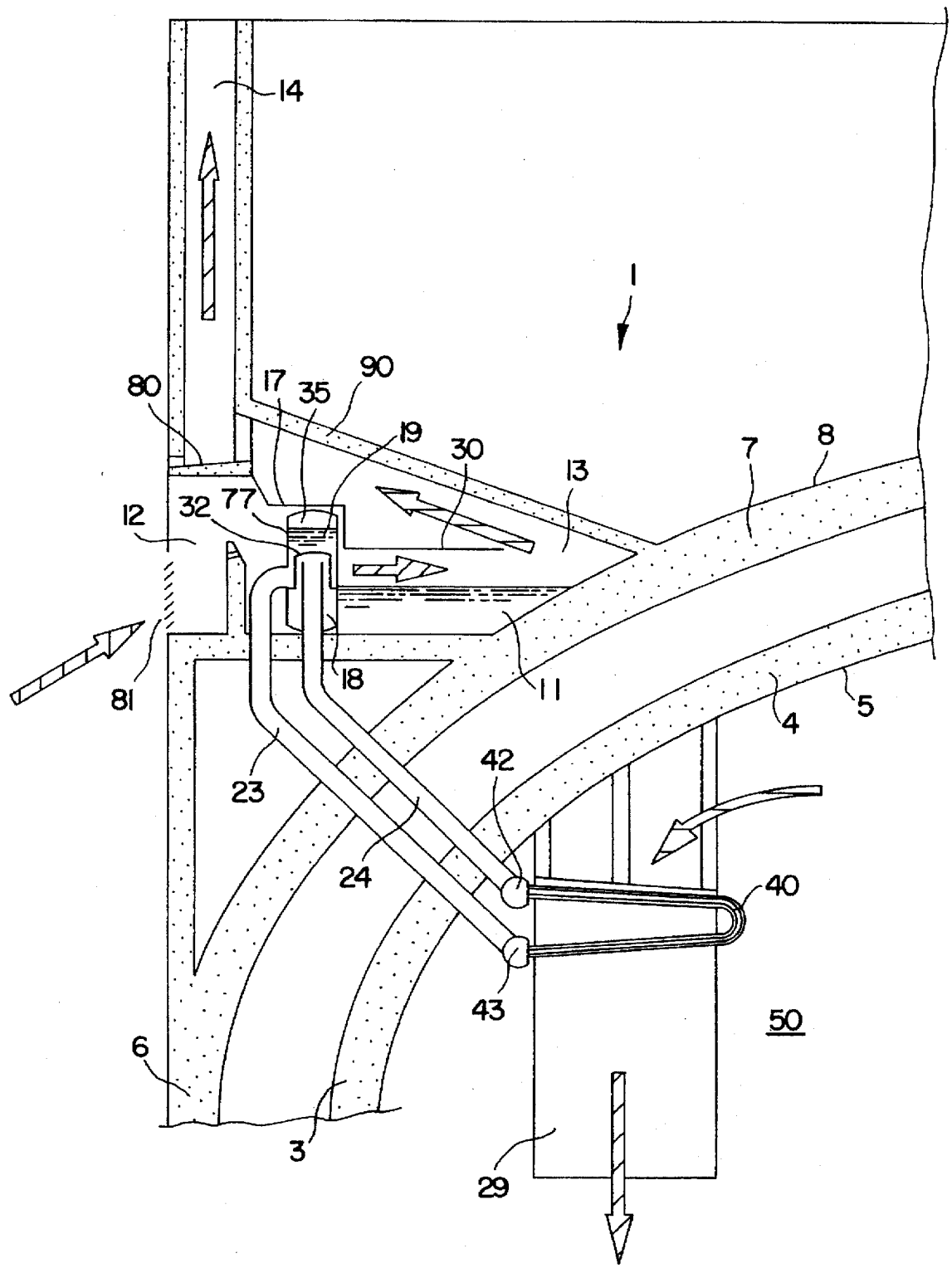
FIG. 8 is a schematic sectional view through the top of a nuclear reactor containment building, with a modified embodiment of the heat dissipating system in operation.
Figure 9:
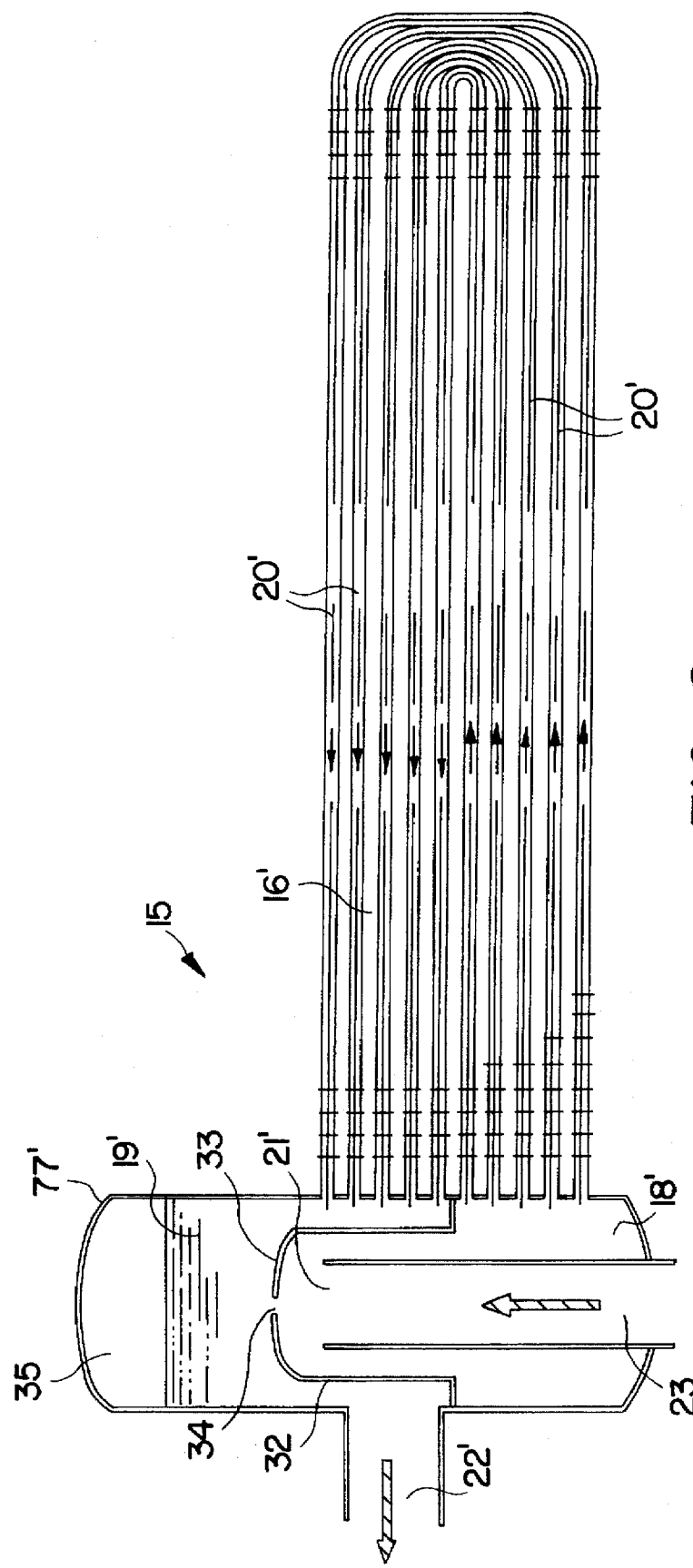
FIG. 9 is a longitudinal section through a tube nest element of the heat exchanger in the pool, according to the modified embodiment of the system shown in FIG. 7.

A modified embodiment of tile system 10 according to the invention will now be described with reference to FIGS. 8 and 9.

In this modification, the thermal carrier fluid being circulated through the closed-loop circuit 28 is a single-phase one. This involves some differences in the construction of the first heat exchanger, denoted by the numeral 15' in FIG. 9.

The delivery 18' and discharge 19' headers are included within a single elongate cylinder vessel 77' having a bell-shaped partition 32 on its interior to divide the vessel 77' and form said headers 18', 19'. Thus, the delivery header 18' is placed at a lower level than the discharge header 19'.

The bell-shaped partition 32 has an apex 33, on its discharge header 19' side, which has a hole 34 therein for communicating the two headers 18', 19' to each other.

In addition, the bell-shaped partition 32 accommodates the inlet section 21' of the delivery header 18', which section will locate, therefore, at a higher level than the outlet section 22' of the discharge header 19'.

Furthermore, the vessel 77' is not intended to be filled up with the thermal carrier fluid, and includes a ceiling 35 for collecting non-condensable gases and steam which may leak through the hole 34 from the stream of inlet thermal carrier before this enters the tube nest elements 16' of the heat exchanger 15'.

In this way, the thermal carrier flowed through the tube nest will be a single-phase, i.e. liquid, fluid. Also, the direction of circulation of the thermal carrier fluid through the closed-loop circuit 28 will be dictated by the mutual positioning of the inlet 21' and outlet 22' sections, so that said fluid will flow first past the submerged portion 15b and then the exposed portion 15a which is in air at a generally lower temperature than the water in the pool 11, thereby improving the overall heat transfer efficiency.

In this modified embodiment of the invention, the second heat exchanger 25 (FIG. 8) is of a type having U-bent horizontal finned tubes.

The operation of the modified embodiment of the system 10 just described is not significantly dissimilar from tile previously described embodiment.

A major advantage of the heat dissipating system according to the invention is that the dissipation of heat can be effected for an indefinite time span without any external intervention becoming necessary for topping up the amount of water contained in the pool 11.

In addition, this system provides for the dissipation of a large amount of heat immediately after the aforementioned emergency situation is entered, without involving large and expensive transfer surfaces.

Furthermore, the temperature within the reactor containment structure can be reduced gradually after entering the emergency situation down to values below 100° C.

Another advantage is that any formation of ice, both within the closed-loop circuit 28 and the pool 11, with the system in a standby condition, can be effectively prevented.

The fully passive operation system of this invention may be assisted by some active operation devices to improve its performance, where such devices can be used.

Figure 10:
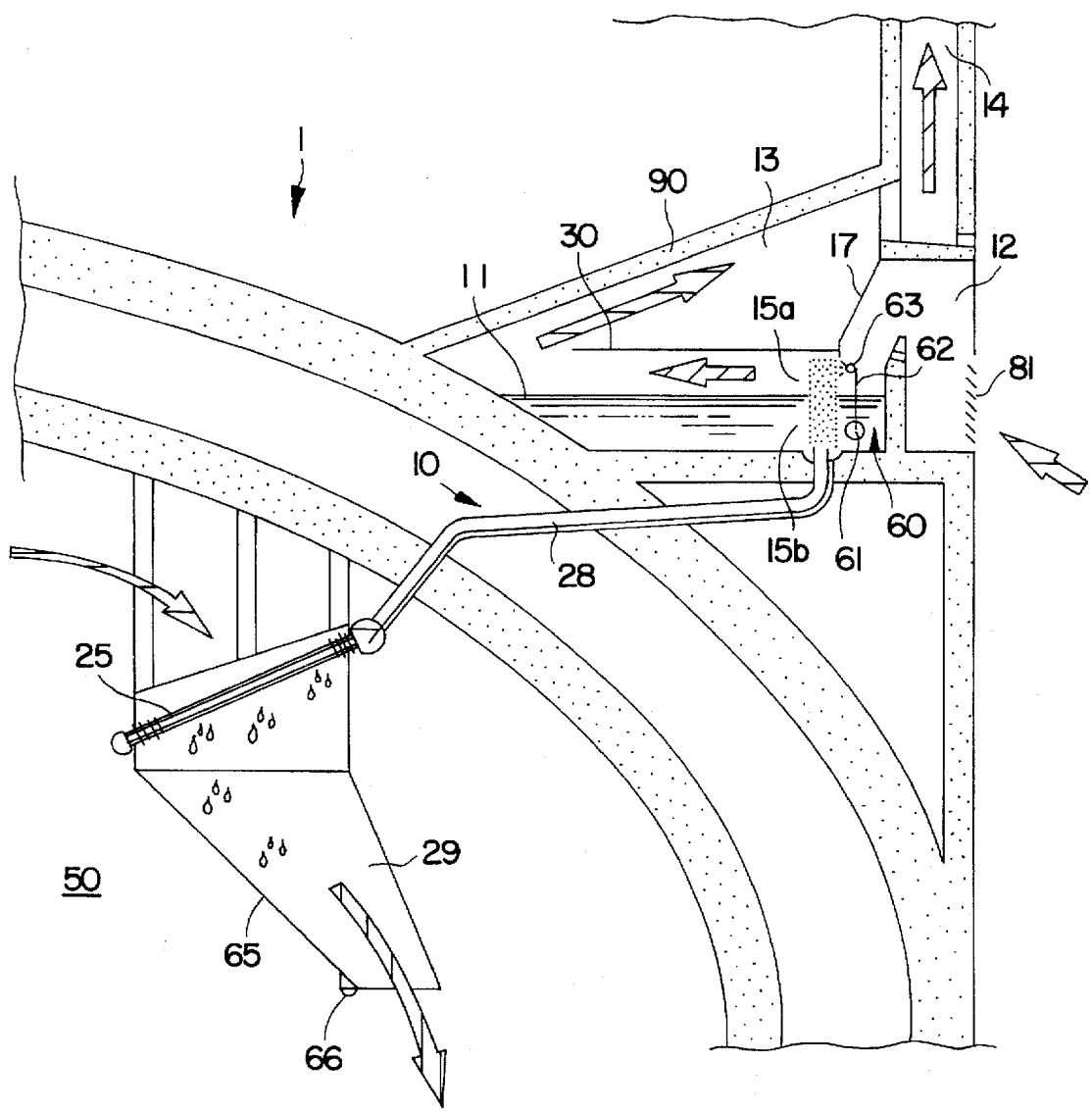
FIG. 10 shows a modification of the heat dissipating system in FIG. 3, with active devices added and while in operation.

In FIG. 10, the pool 11 is shown to include a sprinkle arrangement 60 which comprises a submerged pump 61 drawing directly from the pool 11 and being connected by a pipe 62 to a sprinkler 63 which points toward the tube nest elements 16.

By appropriate operation of the sprinkle arrangement 60, the exposed portion 15a of the exchanger 15 can be cooled to enhance the transfer of heat.

Moreover, an excess of water is produced in the airflow which becomes cooled by evaporation and falls back into the pool, thereby cooling the latter.

Additional active devices, which would be redundant for the purpose of this invention, may comprise a circuit for refilling the pool 11 with water and an auxiliary cooling circuit, also for the pool 11.

By suitably controlling such active arrangements, in the standby condition, the interior space 50 of the reactor 2 containment structure 3 may be air-conditioned, where required.

To prevent condensate formed on the second heat exchanger 25 from falling onto the reactor 2, the open vertical channel 29 is provided, in a modified embodiment thereof illustrated by FIG. 10, with a water collecting wall 65 terminating in a gutter 66.

A further modification of,the system 10, shown in FIG. 1 which is inconsistent with the other drawing figures on this account, may provide for the second ducts 13 to be taken to a common chimney 14 overlying the containment building 1.

It should be understood that, the heat dissipating system of this invention described hereinabove, and the manner of operating it, may in several ways be altered by a skilled one in the art in order to fill particular and contingent demands, still within the scope for protection of the invention as defined in the following claims.

We claim:

1. A system (10) for passively dissipating heat from the interior space (50) of a nuclear reactor (2) containment structure (3,6), wherein said containment structure (3,6) comprises a basement (70), side walls (71,73) and at least one top wall (4,7), the system comprising a first heat exchanger (15,15') placed outside the containment structure (3,6), a second heat exchanger (25) placed inside said reactor containment structure (3,6), said first and second heat exchangers (15,25) being fluid connected to each other in a closed loop circuit (28) by pipes (23,24) containing a thermal carrier fluid and being passed through said containment structure (3,6), and a chimney (14) the top whereof is in communication with the external atmosphere, characterized in that,

- said system (10) includes a pool (11) filled with water to a predetermined level (9), being associated with said containment structure (3,6), and positioned close to its top wall (4,7);
- said first heat exchanger (15,15') is submerged under the water in the pool (11) and extends vertically from a base (75), adjacent to the bottom (74) of the pool (11), to a top portion (76) to divide it into two fluid interconnected regions (11a,11b);
- said pool is provided with a covering (90) defining first (12) and second (13) ducts, each overlying a respective one of the regions (11a,11b) formed by the first vertical heat exchanger (15,15') and being only connected to said respective region (11a,11b);
- one (12) of the ducts being communicated to an outside air intake (81), and the other (13) being communicated to said chimney (14); and
- the interconnection of said ducts (12,13) being inhibited by the water present in the pool (11) when filled to said predetermined level (9).

2. A system (10) according to claim 1, wherein said covering (90) includes at least one partition (17) extending between a bottom wall (80) of said chimney (14) and said top portion (76) of the first heat exchanger (15,15').

3. A system (10) according to claim 2, wherein said partition (17) includes an extension (30) reaching partially above the pool (11) region (11b) connected to said second duct (13) leading to the chimney (14).

4. A system (10) according to claim 1, wherein said first duct (12) in communication with said outside air intake (81) extends outside the pool (11) and below said predetermined water level (9).

5. A system (10) according to claim 2, wherein the partition (17) includes a U-shaped channel (91) facing the pool (11) bottom (74) to accommodate the top portion (76) of the first heat exchanger (15, 15').

6. A system (10) according to claim 1, wherein said second heat exchanger (25) comprises a finned tube (41) bundle (40) interposed between a lower header (42) and an upper header (43) which are placed at different levels and fluid connected through at least one smooth pipe (44).

7. A system (10) according to claim 1, wherein said first heat exchanger (15,15') includes tube nests (16,16') formed of helically finned tubes (20,20').

8. A system (10) according to claim 7, wherein the first heat exchanger (15') has a delivery header (18') located below a discharge header (19'), both headers (18',19') being placed inside a common cylindrical vessel (77') and separated by a bell-shaped partition (32) having an apex (33) provided with a hole (34) therein, said cylindrical vessel (77a) having a gas collecting ceiling (35), and said delivery (18') and discharge (19') headers having respectively an inlet section (21') and an outlet section (22'), said inlet section (21') being accommodated within the bell-shaped partition (32) above said outlet section (22').

9. A system according to claim 6 wherein said second heat exchanger (25) is placed within an open vertical channel (29) extending downwardly from said heat exchanger (25).

* * * * *